May 5, 1964  A. A. HARBAN  3,131,706

METERING HETEROGENEOUS MIXTURES

Filed April 3, 1961

INVENTOR.
ARTHUR A. HARBAN
BY
ATTORNEYS 3,131,706
METERING HETEROGENEOUS MIXTURES
Arthur A. Harban, Bartlesville, Okla., assignor to Phillips Petroleum Company, a corporation of Delaware
Filed Apr. 3, 1961, Ser. No. 100,356
5 Claims. (Cl. 137—15)

This invention relates to metering fixed quantities of a flowing stream of component into a flowing stream. In one aspect, the invention relates to adding measured quantities of a flowing stream to another flowing stream by connecting a passageway of the first stream into the second stream and simultaneously connecting a portion of the passage of the second stream into a purge system and connecting a purged passage into the first stream. In another aspect, this invention relates to novel multiway valves comprising passageways which can be shifted from one stream to another to permit adding a portion of one stream to another stream, and presenting a purged passageway to the first stream.

In conducting numerous chemical reactions, it is desirable that one or more reaction mixture components be metered to the reaction zone at regular intervals and for this purpose various metering devices have been disclosed. Usually the component to be metered is a reagent. When the reagent is introduced in a heterogeneous system, such as a slurry or dispersion, prior art means often are ineffective because of phase separation in the metering lines, valves, etc. It is essential in adding the reagent to prevent contamination of the reagent stream by the stream into which the reagent is charged.

An object of this invention is to transfer measured quantities from a flowing stream of material into another flowing stream while preventing phase separation of the material and preventing contamination of the flowing stream of material by the stream into which the metered quantities are added.

Another object of this invention is to provide improved process and apparatus for carrying out a chemical reaction wherein metered quantities of a reaction mixture component are added at spaced time intervals.

Another object of this invention is to provide improved multiway valves suitable for metering quantities of one flowing stream into another.

Other aspects, objects and the several advantages of this invention are apparent from a study of the disclosure, the drawing and the appended claims.

According to my invention, there is provided a method for adding a component to a flowing stream by flowing the component through a first passageway, flowing the stream through a second passageway, purging a third passageway, and simultaneously changing the connections to the passageways so that the flowing stream flows through the first passageway; the second passageway is purged and the component being added now flows through the third passageway. The component being added often is a heterogeneous system and, to prevent phase separation, is circulated continuously through a path comprising the passageway connected therein. When the connections of the various passageways are changed, an amount of the component being added is trapped in the passageway through which it flows and this passageway is then connected to the flowing stream through which the component is to be added and the amount trapped becomes a part of the flowing stream. To prevent contamination of the components being added, the passageway from the flowing stream into which the material is being injected is purged and, each time the passageways are interchanged, a purged passageway is presented to the circulating component. This method is useful for adding a reaction mixture component to a reaction zone in which a chemical reaction is being conducted.

Also, according to my invention, there is provided apparatus for adding a component to a flowing stream comprising three separate passageways and means for connecting them in sequence into (1) a circulating stream of the component to be added, (2) conduit means for a second flowing stream and (3) means for purging. A rotary valve into which the three passageways are provided is useful in practicing my invention. Means are provided for rotating such a valve to first, second and third positions to connect the three passageways as described.

Further, according to my invention, there is provided apparatus for conducting a chemical reaction including the reactor, a metering valve having a rotary member which contains first, second and third passageways, means communicating with the valve for continuously circulating a first reaction mixture component, a second conduit communicating with the valve for transferring a second reaction mixture component to the reactor, a third conduit communicating with the valve and with a source of purge gas and means for rotating the valve to connect the passageways sequentially with the first, second and third conduits in that order.

Further, according to my invention, there is provided a multiway valve having a plurality of pairs of inlets and corresponding outlets, a rotary member containing a plurality of noncommunicating passageways and means to rotate the rotary member to a plurality of positions to establish communication across each corresponding paired inlet and outlet with the various passageways sequentially. In one embodiment, the multiway valves have a rotary member in which the plurality of noncommunicating passageways each terminate in diametrically opposed openings and the axes of all the openings lie in a single plane perpendicular to the axis of rotation of the rotary member. In another embodiment the multiway valve has a rotary member in which the noncommunicating passageways extend parallel with the axis of the rotary member and establish communication with a plurality of axially aligned inlet and outlet openings as the member is rotated.

In the solution polymerization of olefins in the presence of heterogeneous catalyst systems, the feedstreams to the process comprise solvent, monomers, and catalyst, the latter usually being introduced as a slurry in a hydrocarbon. A convenient procedure for feeding such streams includes conducting the solvent and monomer to the reaction zone through separate lines and adding the catalyst slurry to the solvent feed line in increments to maintain a substantially constant catalyst concentration in the reaction zone.

Figure 1:
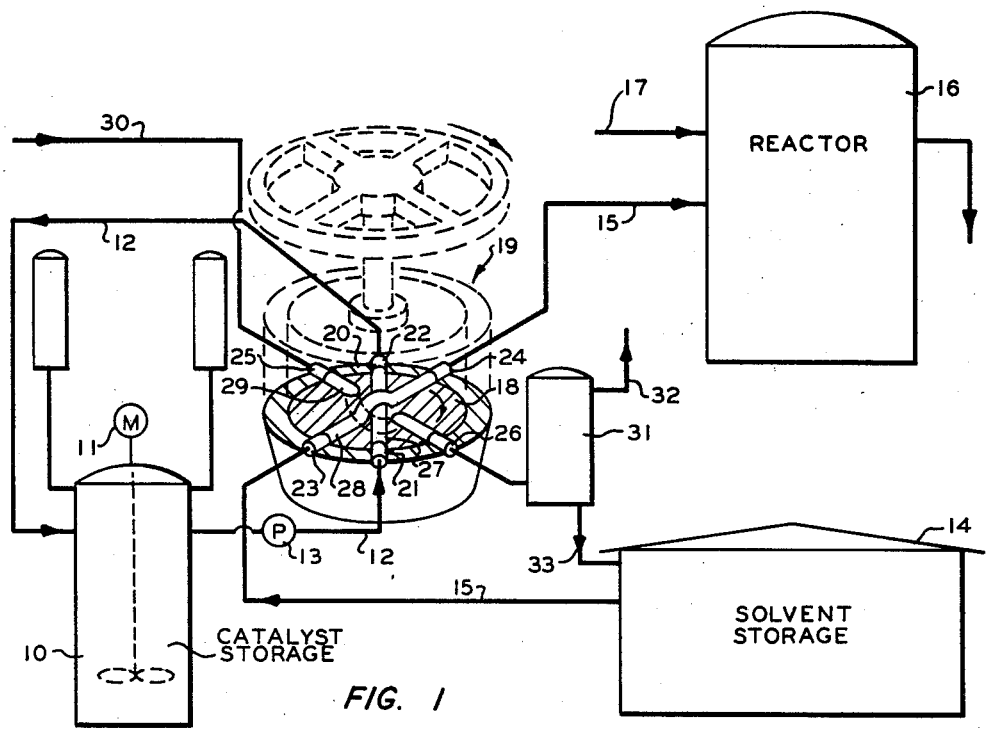
FIGURE 1 is a diagrammatic illustration of one embodiment of my invention applied to a catalytic chemical reaction.

The present invention provides means whereby such a catalyst slurry is maintained as a constantly circulating stream, thereby preventing phase separation therein. Increments of this slurry are added at predetermined intervals in measured amounts. Details of such a system are illustrated in FIGURE 1 wherein an olefin monomer is polymerized in a cyclohexane solvent in the presence of a heterogeneous catalyst system comprising diethyl aluminum chloride and titanium trichloride as a slurry in cyclohexane. This slurry is maintained in dispersed state in storage vessel 10 by mechanical stirrer 11 and by continuous circulation through line 12 containing pump 13. Cyclohexane solvent from storage 14 is conveyed via line 15 to reactor 16 in which it is mixed with olefin monomer introduced through line 17. An increment of catalyst slurry from line 12 is added to the flowing solvent stream in line 15 by rotating member 18 of valve 19.

Valve 19 comprises, in addition to rotary member 18, a body 20 in which are provided pairs of inlet and outlet openings 21—22, 23—24, and 25—26. Rotary member 18 contains first, second and third passageways 27, 28, and 29, respectively. Means (not shown) are provided to rotate member 18 and, preferably, suitable detent means are provided for each 60° of rotation, corresponding to the positions of the inlet and outlet openings.

In the position of rotary member 18 illustrated, the catalyst slurry from vessel 10 is pumped by pump 13 through line 12, inlet 21, passageway 27 and outlet 22 and back to vessel 10. This continuous circulation, together with the agitation provided by stirrer 11, maintains the system thoroughly mixed at all times. Solvent from storage 14 flows continuously through line 15, inlet 23, passageway 28, and outlet 24 to reactor 16. Purge gas flows through line 30, inlet 25, passageway 29 and outlet 26 into a receiver 31 which is provided with a vent 32 and a line 33 connecting with solvent storage 14.

At the proper time determined by the time interval for which it is desired to inject an increment of catalyst, rotary member 18 is turned 60° in the direction shown by the arrow. In this way, passageway 27 containing a portion of the catalyst slurry is aligned with inlet 23 and outlet 24 whereby this portion of the catalyst slurry is discharged with solvent into reactor 16. Line 28 containing solvent is aligned with purge inlet 25 and outlet 26 and this amount of solvent is discharged with purge gas to receiver 31, the gas being vented from 32 and the solvent discharged to solvent storage 14 through line 33. Passageway 29, containing only the inert purge gas, is connected with inlet and outlet 21 and 22 and only this small amount of gas is added to the circulating catalyst stream. If desired, suitable means, not shown, can be provided for venting the gas from the catalyst system.

Valve 19 can be manually operated, if desired, but it is preferred to employ a motor or a spring driven timing mechanism whereby the valve is rotated according to a predetermined schedule. By suitable programming of this schedule the catalyst level can be controlled in accord with desired reaction conditions. Suitable automatic control means can be provided to adjust the program according to a process variable. For example, in some instances reactor temperature can be utilized to adjust the speed of a programmer motor to adjust the frequency of catalyst injections.

The valve 19 described above has a rotatable member wherein three noncommunicating conduits are disposed, having their axes in a plane perpendicular with the axis of rotating member 18.

The pairs of inlets and outlets are diametrically opposed and spaced at 60° intervals around the periphery of the rotating member to permit the three passageways to be sequentially aligned with (1) a continuously circulating stream of a heterogeneous system containing a reaction mixture component, (2) a continuously flowing stream of a second reaction mixture component being fed to a reactor, and (3) a continuously flowing stream of inert purge gas.

Figure 2:
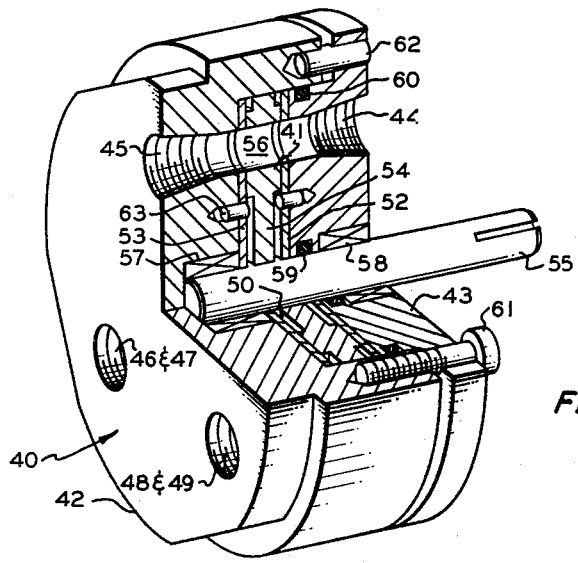
FIGURE 2 is a diametric view of a multiway valve according to another embodiment of my invention.

A second embodiment of a multiway valve for use in my invention is illustrated in FIGURE 2. This embodiment comprises a body 40 and a rotating member 41. Body 40 comprises two stationary members 42 and 43.

Members 42 and 43 are provided with matched and aligned pairs of inlet and outlet openings 44—45, 46—47 and 48—49. These openings are threaded as shown to provide means for attachment to suitable flow conduits (not shown). Members 42 and 43 define a chamber 50 in which are disposed rotary member 41 and gaskets 52 and 53. Rotary member 41 comprises disc 54 attached to shaft 55, and contains three openings actually aligned with shaft 55 and equally spaced radially and circumferentially around shaft 55. One of these openings 56 is visible in FIGURE 2. Suitable bearing means 57 and 58 are provided in members 42 and 43 as well as sealing means such as O-rings 59 and 60. The various elements of the valve are held together by screws 61 and the parts are aligned for assembly by aligning pins 62. The plurality of pins 63 are provided to prevent movement of gaskets 52 and 53 relative to the stationary members 42 and 43. Preferably the valve body members and rotating member are made from a metal which is inert with respect to the various materials being circulated therethrough and providing the desired strength and wear characteristics. Gaskets 52 and 53 must be sufficiently resilient to provide a continuous seal around the various inlet and outlet openings and have suitable surface characteristics of wear and friction, permitting movement of rotating member 41 without undue friction or damage to these gaskets. In the system described herein, a 4140 steel is used for the metal body and rotating disc while a polytetrafluoroethylene sheet material is used for gaskets 52 and 53.

Although not illustrated, suitable detent means can be provided for the three positions in which the pairs of inlet and outlet openings are aligned with the openings in rotating disc 54. In this connection, it is noted that the valve illustrated in FIGURE 2 is rotated 120° for each metering operation whereas the valve illustrated in FIGURE 1 is rotated 60° for each transfer.

While the foregoing embodiment is directed to an olefin polymerization system using specific catalyst components in dispersing materials, the invention also can be used with other media and other catalyst systems and is applicable as well to numerous operations other than olefin polymerization. The advantages of my invention are realized in any system in which a component is to be charged to a flowing stream and in which it is desired to avoid contamination of this mixture by the ingredients of the stream to which it is being charged. It is useful for adding a fluid whether a single material, slurry of solid suspended in a fluid, or solution of a material in a solvent, etc. My invention is particularly useful in any system in which it is necessary to maintain continuous circulation of a component and to add measured amounts of this component to a flowing stream.

The purge gas is inert and free from contaminates such as nitrogen, water vapor, sulfur-containing gases, or other contaminates detrimental to the reagent being added or to the system to which it is being added. Nitrogen and methane are two examples of a purge gas suitable for use in the olefin polymerization system described above.

Reasonable variations and modifications are possible within the scope of this disclosure, the drawing and the appended claims to the invention in which are set forth method and apparatus for adding metered portions of a component of one flowing stream into another flowing stream while preventing contamination of the first stream with the second by changing the connections of flow passageways from one stream to another, the passageway from the second stream being purged prior to being placed in the first stream; and novel multiway valves providing means for quickly changing the connections of a plurality of noncommunicating passageways.

What is claimed is:

1. A method for adding a component to a flowing stream, comprising the steps of:
circulating said component by flowing said component into one end of a first flow passageway having a finite volume and out the opposite end of said first passageway;
simultaneously flowing said stream into one end of a second flow passageway having a finite volume and out the opposite end of said second passageway;
simultaneously flowing a purge material into one end of a third flow passageway having a finite volume and out the opposite end of said third passageway;
simultaneously changing the connections of said passageways;
    to trap portion of said component in said first passageway and flow said stream through said first passageway to entrain the entire trapped amount of said component in said stream;
    to trap a portion of said stream in said second passageway and flow said purge materials through said second passageway to remove the entire trapped amount of said stream into said purge material; and
    to trap a portion of said purge material in said third passageway and circulate said component through said third passageway to entrain purge material in said component;
subsequently simultaneously changing the connections of said passageways;
    to trap a second portion of said component in said third passageway and flow said stream through said third passageway to entrain the entire trapped amount of said component in said stream;
    to trap a portion of said stream in said first passageway and flow said purge material through said first passage to remove the entire trapped amount of said stream into said purge material; and
    to trap a portion of said purge material in said second passageway and to circulate said component through said second passageway to entrain only purge material in said component;
subsequently simultaneously changing the connections of said passageway;
    to trap a third portion of said component in said second passageway and flow said stream through said second passageway to entrain the entire trapped amount of said component in said stream;
    to trap a third portion of said stream in said third passageway and flow said purge material through said third passageway to remove the entire trapped amount of said stream into said purge material; and
    to trap a third portion of said purge material in said first passageway and circulate said component through said first passageway to entrain only purge material in said component; and
subsequently repeating in sequence the changing of the connections of said passageways to repeat the above steps as necessary to add the desired amount of said component into said flowing stream without contamination of said component with said stream.

2. A method for adding a material to a flowing stream comprising the steps of:
continuously circulating a heterogeneous mixture comprising said material by flowing said mixture, while circulating, into one end of a first flow passageway having a finite volume and out the opposite end of said first passageway without restriction;
simultaneously flowing said stream into one end of a second flow passageway having a volume equal to said first passageway volume and out the opposite end of said passageway;
simultaneously flowing a purge material into one end of a third flow passageway having a volume equal to said first passageway and out the opposite end of said third passageway;
simultaneously changing the connections of said passageways;
    to trap a portion of said mixture in said first passageway and flow said stream through said first passageway to entrain the entire trapped amount of said mixture in said stream;
    to trap a portion of said stream in said second passageway and flow said purge material through said second passageway to remove the entire trapped amount of said stream into said purge material; and
    to trap a portion of said purge material in said third passageway and circulate said mixture through said third passageway to entrain only purge material in said mixture;
subsequently simultaneously changing the connections of said passageways;
    to trap a second portion of said mixture in said third passageway and flow said stream through said third passageway to entrain the entire trapped amount of said mixture in said stream;
    to trap a portion of said stream in said first passageway and flow said purge material through said first passage to remove the entire trapped amount of said stream into said purge material; and
    to trap a portion of said purge material in said second passageway and to circulate said mixture through said second passageway to entrain only purge material in said mixture;
subsequently simultaneously changing the connections to said passageway;
    to trap a third portion of said mixture in said second passageway and flow said stream through said second passageway to entrain the entire trapped amount of said mixture in said stream;
    to trap a third portion of said stream in said third passageway and flow said purge material through said third passageway to remove the entire trapped amount of said stream into said purge material; and
    to trap a third portion of said purge material in said first passageway and circulate said mixture through said first passageway to entrain only purge material in said mixture; and
subsequently repeating in sequence the changing of the connections of said passageways to repeat the above steps as necessary to add the desired amount of said mixture into said flowing stream without contamination of said mixture with said stream.

3. A process for polymerizing an olefin monomer which comprises:
feeding said monomer into a polymerization zone;
maintaining polymerization conditions for said monomer in said zone;
flowing a stream of solvent for said olefin to said polymerization zone;
continuously circulating a stream of a slurry of a solid polymerization catalyst for said monomer;
passing said stream of slurry, while circulating, into one end of a first flow passageway having a finite volume and out the opposite end of said first passageway;
simultaneously passing said stream of solvent, while flowing through said polymerization zone, into one end of a second flow passageway having a volume equal to said first volume and out the opposite end of said second passageway;
simultaneously passing a stream of an inert purge gas into one end of a third flow passageway having a volume equal to said first volume and out the opposite end of said third passageway;

simultaneously changing the connections of said passageways;
to trap a portion of said slurry in said first passageway and flow said stream of solvent through said passageway to entrain the entire trapped amount of said slurry in said stream;
to trap a portion of said stream of solvent in said second passageway and flow said inert purge gas through said second passageway to remove the entire trapped amount of said stream into said purge gas; and
to trap a portion of said inert purge gas in said third passageway and circulate said slurry through said third passageway to entrain only purge gas in said slurry;

subsequently simultaneously changing the connections of said passageways;
to trap a second portion of said slurry in said third passageway and flow said stream of solvent through said third passageway to entrain the entire trapped amount of said slurry in said stream;
to trap a portion of said stream of solvent in said first passageway and flow said inert purge gas through said first passage to remove the entire trapped amount of said stream into said purge gas; and
to trap a portion of said inert purge gas in said second passageway and circulate said slurry through said second passageway to entrain only purge gas in said slurry;

subsequently simultaneously changing the connections of said passageway;
to trap a third portion of said slurry in said second passageway and flow said stream of solvent through said second passageway to entrain the entire trapped amount of said slurry in said stream;
to trap a third portion of said stream of solvent in said third passageway and flow said inert purge gas through said third passageway to remove the entire trapped amount of said stream into said purge gas; and
to trap a third portion of said inert purge gas in said first passageway and circulate said slurry through said first passageway to entrain only purge gas into said slurry; and subsequently repeating in sequence the changing of the connections of said passageways to repeat the above steps as necessary to add the desired amount of said slurry into said flowing stream of solvent without contamination of said slurry with said stream.

4. Apparatus for adding a heterogeneous mixture to a substance, comprising:
means for storing and circulating said mixture continuously, comprising,
a storage vessel having means to maintain said mixture stirred;
a pump;
an outlet from said vessel communicating with the inlet of said pump;
an inlet to said vessel communicating with the outlet of said pump;
a first unobstructed passageway through which said mixture flows while circulating;
means for producing a flowing stream of said substance, comprising a second unobstructed flow passageway through which said substance flows;
means for flowing a purge material comprising a third unobstructed flow passageway, said first, second and third passageways being oriented at 120 angular degree intervals;
a rotary member having first, second and third unobstructed chambers therein oriented at 120 angular degree intervals, said rotary member being positioned with respect to said first, second and third passageways to place:
in a first rotary position, said first chamber in said first passageway, said second chamber in said second passageway, and said third chamber in said third passageway;
in a second rotary position, said first chamber in said second passageway, said second chamber in said third passageway, and said third chamber in said first passageway; and
in a third position, said first chamber in said third passageway, said second chamber in said first passageway, and said third chamber in said second passageway;
means to rotate said rotary member successively through said first, second and third rotary positions repeatedly, whereby, when said member is rotated from each of said positions, a first quantity of said mixture is trapped in a chamber and the chamber containing said mixture positioned in said second passageway to which said substance flows to entrain the entire trapped amount of said component in said substance, the chamber in communication with said second passageway is moved to said third passageway to trap a portion of said substance which entire trapped portion of said substance is removed into said purge material, and the chamber in said third passageway is moved to said first passage to entrain only purge material in said mixture.

5. Apparatus for conducting a chemical reaction, comprising:
a reactor;
means for storing and circulating a catalyst slurry continuously, comprising:
a catalyst storage vessel having means to maintain said slurry stirred;
a pump;
an outlet from said vessel communicating with the inlet of said pump;
an inlet to said vessel communicating with the outlet of said pump;
a first unobstructed passageway through which said slurry flows while circulating;
means for producing a flowing stream of a reactant mixture component, comprising a second unobstructed flow passageway through which said component flows;
means for flowing a purge gas, comprising a third unobstructed flow passageway, said first, second and third passageways being oriented at 120 angular degree intervals;
a rotary member having first, second and third unobstructed chambers therein oriented at 120 angular degree intervals, said rotary member being positioned with respect to said first, second and third passageways to place:
in a first rotary position, said first chamber in said first passageway, said second chamber in said second passageway, and said third chamber in said third passageway;
in a second position, said first chamber in said second passageway, said second chamber in said third passageway, and said third chamber in said first passageway; and
in a third position, said first chamber in said third passageway, said second chamber in said first passageway, and said third chamber in said second passageway;
means to rotate said rotary member successively through said first, second and third rotary position repeatedly, whereby, when said member is rotated from each of said positions a fixed quantity of said catalyst slurry is trapped and the entire trapped amount thereof entrained in said reaction component, a corresponding amount of said reaction component is trapped and removed by said purge gas, and a corresponding amount of said purge gas is trapped and only purge gas is entrained in said slurry.

References Cited in the file of this patent

UNITED STATES PATENTS

| | | |
|---|---|---|
| 2,301,428 | MacNeil | Nov. 10, 1942 |
| 2,450,715 | Campbell | Oct. 5, 1948 |
| 2,619,274 | Geiger | Nov. 25, 1952 |
| 2,680,683 | Obenshain | June 8, 1954 |
| 2,959,330 | Charbonneau | Nov. 8, 1960 |
| 2,964,061 | Rawson | Dec. 13, 1960 |
| 2,981,092 | Marks | Apr. 25, 1961 |
| 3,000,218 | Marks et al. | Sept. 19, 1961 |
| 3,008,491 | Riefler | Nov. 14, 1961 |